3,558,362
BATTERY SEAL
Edwin J. McHenry, Millington, N.J., assignor to Bell Telephone Laboratories, Incorporated, Murray Hill and Berkeley Heights, N.J., a corporation of New York
Filed Nov. 18, 1968, Ser. No. 776,468
Int. Cl. H01m 1/02
U.S. Cl. 136—133     1 Claim

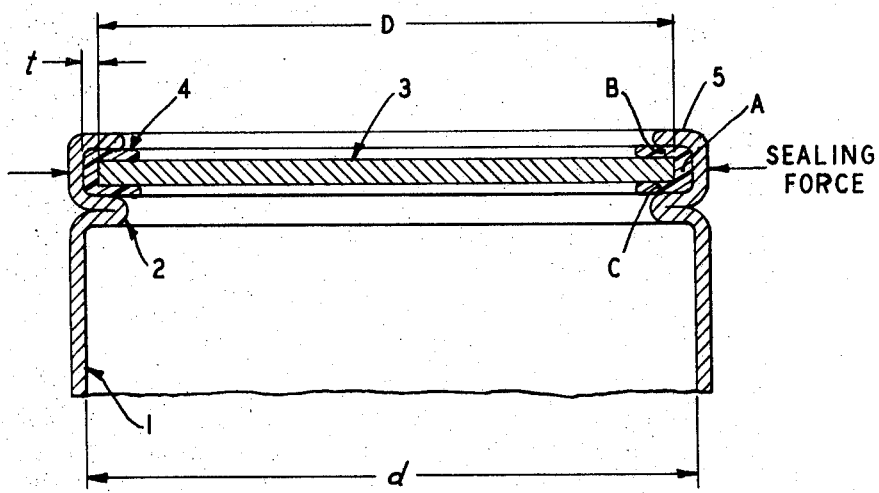

ABSTRACT OF THE DISCLOSURE

The specification describes an improved seal for a hermetically sealed battery. The design of the receptacle is essentially that commonly used for cylindrical or D size alkaline batteries. The improvement in the seal involves constructing the can and the cover from different materials. If the materials are properly selected on the basis of their thermal coefficients of expansion the stress on the sealing gasket as the result of thermal cycling over the normal ambient range can be minimized.

---

This invention relates to receptacles for sealed electrolytic cells.

A common problem in sealed alkaline battery applications is leakage of the electrolyte from the terminals. Generally, the thermal seals are made by compression of a plastic gasket between the metal terminal and the metal can. In ordinary use, the battery may be subjected to temperature fluctuations of as much as 100° C. Since nearly all practical gasket materials have thermal coefficients of linear expansion of the order of $10^{-4}$ in./in./° C., this temperature fluctuation will cause a dimensional change of about one per cent. The expansion coefficient of metal is normally one fifth to one tenth that of the gasket so that expansion is restricted and increased stress is applied to the gasket upon heating the battery. Continued thermal cycling eventually fatigues the gasket material and the battery develops a leak. This thermal stress can be reduced significantly by the use of a thermal compensating seal design.

The basic design geometry of the seal is essentially the same as one widely used in commercial practice. The difference according to the invention is that the materials of construction are specially chosen so that stresses arising from thermal expansion are minimized. This requires that the can and the cover lid be made from materials having different coefficients of expansion, the difference being sufficient to allow for the thermal expansion of the sealing gasket.

These and other aspects of the invention may become more evident from a consideration of the following specific description. In the drawing:

The figure is a front section of a battery in which the receptacle is constructed in accordance with the teachings of this invention.

The metal can 1 is crimped at 2 to form a shoulder. A metal top 3 with a plastic gasket 4 around the edge is placed into the can resting on the shoulder. The top of the can 5 is spun or crimped over closing the cell. Pressure is applied radially thus sealing the receptacle at point A.

Nickel plated low carbon steel and nylon are common materials of construction of commercial cells and will be used to illustrate the design of a temperature compensating seal for the cell design of the figure. Since low carbon steel has a relatively low thermal expansion coefficient it will be chosen as an illustrative material for the top. Normally a gasket thickness of approximately 0.050 inch is desirable and the diameter of the can is typically 1.25 inches with a wall thickness of 0.020 inch. The following variable are thus fixed:

Top expansion coefficient: $12.1 \times 10^{-6}$ in./in./° C.
Gasket expansion coefficient: $83 \times 10^{-6}$ in./in./° C.
Can diameter $d^1$: $1.25 - 2(.020) = 1.21$ inches
Gasket thickness $t^1$: approx. 0.050 inch
Top diameter $D^1$: 1.11 inches In order to calculate the coefficient of expansion of the can we assume a temperature fluctuation T:
Expansion of gasket is:

$$(2) \; .050 \; (83 \times 10^{-6}) T = 8.3 \times 10^{-6} T$$

Expansion of top is:

$$1.11(12.1 \times 10^{-6}) T = 13.4 \times 10^{-6} T$$

For compensation:

$$\Delta d - \Delta D = \Delta t \text{ or } \Delta d - 13.4 \times 10^{-6} T = 8.3 \times 10^{-6} T$$

$$\Delta d = 1.21 \times T = 21.7 \times 10^{-6} T$$

$$\text{Expansion coefficient} = \frac{21.7 \times 10^{-6}}{1.21}$$

$$= 18.0 \times 10^{-6} \text{ in./in./° C.}$$

The thermal expansion coefficient of the can should approximate $18.0 \times 10^{-6}$ in./in./° C. for compensation. Exemplary materials which may be used are:

|  | In./in./° C. |
|---|---|
| Yellow brass | $18.9 \times 10^{-6}$ |
| 304 stainless steel | $17.3 \times 10^{-6}$ |
| Copper | $16.7 \times 10^{-6}$ |

The copper or brass should be nickel plated to prevent corrosion. Exact matching of the thermal expansion can be accomplished with a material, such as those above, having a coefficient departing slightly from the ideal value by varying the gasket thickness. There is no restriction on the material used so long as it is compatible with the mechanical and chemical requirements of the battery and the materials and dimensions are chosen so that there is matching of the expansion.

This specific embodiment assumes a linear type of expansion and the linear coefficients have been used for illustration. In actual practice it is found that the expansion of the gasket 4 of the figure is intermediate between that described by the linear coefficient and that described by the volume coefficient. This is intuitively plain since some of the stress will be relieved by strain at points B and C. Consequently the actual expansion compensated for lies between the linear expansion and the volume expansion. As a generally accepted approximation the volume coefficient of expansion is approximately three times the linear coefficient.

What is claimed is:
1. A hermetically sealed nickel-cadmium cell comprising a cylindrical metal can open at one end, a cover disk surrounded at its edge with a sealing gasket engaging the inner periphery of the open end so as to enclose the metal can, the metal can being crimped or otherwise mechanically deformed so as to effect a seal between the wall of the can and the edge portion of the cover disk the improvement wherein the can is a nickel-plated copper alloy having a coefficient of thermal expansion of approximately $18 \times 10^{-6}$ in./in./° C. and a thickness of the order of 0.020 inch, the cover disk is a low carbon steel having a diameter of the order of one inch and a coefficient of thermal expansion of approximately $12 \times 10^{-6}$ in./in./° C. and the sealing gasket is nylon having a thickness of approximately 50 mils.

References Cited

UNITED STATES PATENTS

| | | | |
|---|---|---|---|
| 2,526,640 | 10/1950 | Daniel | 136—133X |
| 3,069,489 | 12/1962 | Carmichael et al. | 136—133 |
| 3,184,342 | 5/1965 | Seibel | 135—133X |
| 3,348,848 | 10/1967 | Lucking et al. | 277—26 |

DONALD L. WALTON, Primary Examiner

U.S. Cl. X.R.

136—166; 200—46; 277—26